| (12) | United States Patent<br>Rune et al. | (10) Patent No.: US 10,362,476 B2<br>(45) Date of Patent: Jul. 23, 2019 |
|---|---|---|

(54) METHOD FOR SENDING OR RECEIVING SYSTEM INFORMATION

(71) Applicant: Telefonaktiebolaget L M Ericsson (publ), Stockholm (SE)

(72) Inventors: Johan Rune, Lindingö (SE); Pål Frenger, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/438,724

(22) PCT Filed: Oct. 29, 2012

(86) PCT No.: PCT/SE2012/051169
§ 371 (c)(1),
(2) Date: Apr. 27, 2015

(87) PCT Pub. No.: WO2014/070048
PCT Pub. Date: May 8, 2014

(65) Prior Publication Data
US 2015/0256995 A1   Sep. 10, 2015

(51) Int. Cl.
*H04W 8/18* (2009.01)
*H04W 48/10* (2009.01)
*H04W 48/12* (2009.01)

(52) U.S. Cl.
CPC ........... *H04W 8/186* (2013.01); *H04W 48/12* (2013.01); *H04W 48/10* (2013.01)

(58) Field of Classification Search
CPC ...... H04W 8/186; H04W 48/12; H04W 48/10
See application file for complete search history.

(56) References Cited

U.S. PATENT DOCUMENTS 9,001,723 B1 * 4/2015 Singh .................... H04W 24/00
370/312
2006/0166693 A1 * 7/2006 Jeong .................... H04W 48/16
455/525

(Continued)

FOREIGN PATENT DOCUMENTS

EP     1553798 A1     7/2005
EP     2323426 A1 *  5/2007   ............ H04W 48/12

(Continued)

OTHER PUBLICATIONS

3GPP, "3rd Generation Partnership Project; Technical Specification Group Radio Access Network; Radio Resource Control (RRC); Protocol specification (Release 11)", 3GPP TS 25.331 V11.3.0, Sep. 2012, 1-34.

(Continued)

*Primary Examiner* — Brandon J Miller
(74) *Attorney, Agent, or Firm* — Murphy, Bilak & Homiller, PLLC

(57) ABSTRACT

It is presented a method, performed in a network node, for sending system information. The method comprises the steps of: broadcasting, using at least one message, a system information table and a version indicator of the system information table, wherein each entry of the system information table comprises an entry identifier and a set of system access parameters, such that a radio node broadcasting an entry identifier is accessible through system access by a wireless terminal having access to the system information table; and broadcasting, a version message comprising the version indicator of the system information table, the version message omitting the system information table. A corresponding network node and wireless terminal are also presented.

18 Claims, 4 Drawing Sheets

(56) References Cited

U.S. PATENT DOCUMENTS

| | | | | |
|---|---|---|---|---|
| 2007/0111751 A1* | 5/2007 | Iimori | ............... | H04W 36/0077 |
| | | | | 455/550.1 |
| 2008/0108376 A1 | 5/2008 | Chen et al. | | |
| 2009/0253422 A1 | 10/2009 | Fischer et al. | | |
| 2013/0058283 A1* | 3/2013 | Cho | ...................... | H04W 48/10 |
| | | | | 370/328 |
| 2013/0258938 A1* | 10/2013 | Sagfors | ................. | H04W 72/02 |
| | | | | 370/312 |

FOREIGN PATENT DOCUMENTS

| | | | | | |
|---|---|---|---|---|---|
| EP | 2323426 A1 | * | 5/2011 | ............ | H04W 48/12 |
| WO | 2012002689 A2 | | 1/2012 | | |
| WO | 2013077783 A1 | | 5/2013 | | |

OTHER PUBLICATIONS

Unknown, Author, "Remaining Issues in System Information Delivery", Samsung, 3GPP TSG RAN WG2 #68 bis, R2-100536, Valencia, Spain, Jan. 18-22, 2010, 1-2.

* cited by examiner

METHOD FOR SENDING OR RECEIVING SYSTEM INFORMATION

TECHNICAL FIELD

The invention relates to methods, network node and wireless terminal for sending or receiving system information.

BACKGROUND

In traditional cellular systems, network nodes, such as base stations, transmit reference signals and system information, to wireless terminals on a broadcast channel. In this way, wireless terminals receive parameters which are required to gain access to the system.

However, there are many network nodes in a cellular system and network utilisation is on average low or very low in many cells. Hence, a lot of energy is wasted on a network level when system access parameters are repeatedly transmitted in cells, even when no wireless terminals are present in many cells.

It would be beneficial if there was a way to reduce the amount of system information which is broadcasted, while still allowing wireless terminals to obtain up to date system information.

SUMMARY

According to a first aspect, it is presented a method, performed in a network node, for sending system information. The method comprises the steps of: broadcasting, using at least one message, a system information table and a version indicator of the system information table, wherein each entry of the system information table comprises an entry identifier and a set of system access parameters, such that a radio node broadcasting an entry identifier is accessible through system access by a wireless terminal having access to the system information table; and broadcasting, a version message comprising the version indicator of the system information table, the version message omitting the system information table. By broadcasting the version message separately from the system information table, the amount of system information being broadcast is significantly reduced. When deployed across an entire network, this can significantly reduce energy requirements, which has positive environmental and financial effects. Furthermore, wireless terminals only need to process system information tables broadcasted from the network node when the version indicator indicates that the system information table in the wireless terminal needs to be updated.

The step of broadcasting the system information table may be performed less frequently than the step of broadcasting the version message. This reduces broadcast system information even more.

The method may further comprise the step, prior to the step of broadcasting the system information table, of: receiving a request from a wireless terminal to broadcast a current system information table. In such a case, the step of broadcasting the system information table is performed in response to the step of receiving a request from the wireless terminal. This allows the wireless terminal to receive an up to date system information table on demand. The step of broadcasting the system information table is optionally only performed in response to the step of receiving a request from the wireless terminal. By only broadcasting the system information table when a request is received from the wireless terminal, there is no need to periodically broadcast system information tables, which reduces the broadcasted system information even further.

The version message may comprise a network identifier. This allows the wireless terminal to distinguish the system information between networks.

According to a second aspect, it is presented a network node arranged to send system information to a wireless terminal. The network node comprises: a processor; and a computer program product storing instructions that, when executed by the processor, causes the network node to: broadcast, using at least one message, a system information table and a version indicator of the system information table, wherein each entry of the system information table comprises an entry identifier and a set of system access parameters, such that a radio node broadcasting an entry identifier is accessible through system access by a wireless terminal having access to the system information table; and broadcast, a version message comprising the version indicator of the system information table, the version message omitting the system information table.

The instructions may be configured to broadcast the system information table less frequently than broadcasting the version message.

The computer program product may further comprise instructions to: receive a request from a wireless terminal to broadcast a current system information table. In such a case, the instructions to broadcast the system information table are performed in response to the instructions to receive a request from the wireless terminal.

The instructions to broadcast the system information table are optionally only performed in response to the instructions to receive a request from the wireless terminal.

The version message may comprise a network identifier.

According to a third aspect, it is presented a method, performed in a wireless terminal for receiving system information. The method comprises the steps of: receiving, using at least one message over a broadcast channel from a network node, a system information table and a version indicator of the system information table, wherein each entry of the system information table comprises an entry identifier and a set of system access parameters; storing the system information table and the version indicator; receiving, over a broadcast channel from the network node, a version message comprising a second version indicator of a system information table, the version message omitting the system information table; and when the version indicator of the system information table and second version indicators refer to different versions, obtaining a new system information table associated with the second version indicator.

The method may further comprise the steps of: receiving, over a broadcast channel from a radio node, a radio node broadcast message comprising the entry identifier; obtaining, from the system information table, a current set of system access parameters associated with the entry identifier; and performing a system access procedure using the current set of system access parameters to set up a connection with the radio node.

The step obtaining the new system information table may comprise: receiving a new system information table and a version indicator of the new system information table, wherein the version indicator of the new system information table and the second version indicator refer to the same version.

The method may further comprise the step of: sending a request to the network node to broadcast a current system information table.

According to a fourth aspect, it is presented a wireless terminal arranged to receive system information over a broadcast channel from a network node. The wireless terminal comprises: a processor; and a computer program product storing instructions that, when executed by the processor, causes the wireless terminal to: receive, using at least one message, a system information table and a version indicator of the system information table, wherein each entry of the system information table comprises an entry identifier and a set of system access parameters; store the system information table and the version indicator; receive, over a broadcast channel, a version message comprising a second version indicator of a system information table, the version message omitting the system information table; and when the version indicator of the system information table and second version indicators refer to different versions, obtain a new system information table associated with the second version indicator.

The computer program product may further comprise instructions to: receive, over a broadcast channel from a radio node, a radio node broadcast message comprising the entry identifier; obtain, from the system information table, a current set of system access parameters associated with the entry identifier; and perform a system access procedure using the current set of system access parameters to set up a connection with the radio node.

The instructions to obtain the new system information table may comprise instructions to: receive a new system information table and a version indicator of the new system information table, wherein the version indicator of the new system information table and the second version indicator refer to the same version.

The computer program product may further comprise instructions to send a request to the network node to broadcast a current system information table.

It is to be noted that any feature of any aspect can be applied, where appropriate, to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
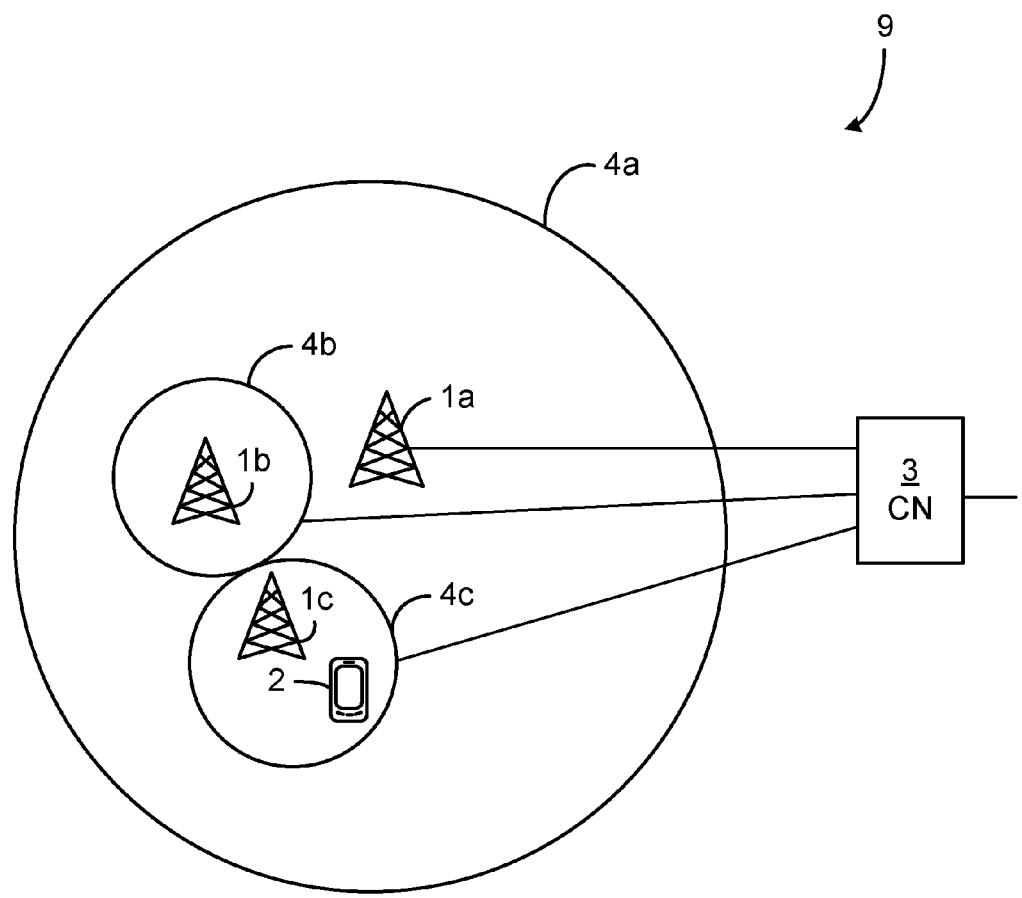
FIG. 1 is a schematic diagram illustrating a cellular network where embodiments presented herein may be applied.

FIG. 1 is a schematic diagram illustrating a cellular network 9 where embodiments presented herein may be applied. The cellular communications network 9 comprises a core network 3 and one or more network nodes 1a-c, here in the form of radio base stations or evolved Node Bs, also known as eNodeBs or eNBs. The network nodes 1a-c could also be in the form of Node Bs and/or RNCs (Radio Network Controllers), BTSs (Base Transceiver Stations) and/or BSSs (Base Station Subsystems), etc. The network nodes 1a-c provide radio connectivity to a plurality of wireless terminals 2. The term wireless terminal is also known as user equipment, mobile terminal, user terminal, user agent, etc. The network nodes 1 are also connected to a core network 3 for connectivity to central functions and other networks. The core network 3 also comprises one or more network nodes which can be used by methods disclosed in more detail below.

Each one of the network nodes 1a-c provides radio coverage in one or more respective radio cells 4a-c. In FIG. 1, a first radio network node 1a is responsible for a first radio cell 4a, a second radio network node 1b is responsible for a second radio cell 4b and a third radio network node 1c is responsible for a third radio cell 4c. In this example, the first radio cell 4a is larger than, and encompasses, the second radio cell 4b and the third radio cell 4c, whereby the first network node 1a can be called a macro node.

The cellular network 9 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Uplink (UL) and downlink (DL) communication between each wireless terminal 2 and the radio base station 1 occurs over a wireless radio interface The wireless radio interface comprises the ability to use both random access/broadcast channels such as a Random Access Channel (RACH), a system broadcast channel (BCH) and dedicated communication channels to and/or from each wireless terminal 2.

In embodiments presented herein, a system information (SI) table is used, allowing an efficient way of providing wireless terminals with system access parameters. Each network node is assigned one entry in such an SI table, but the same system information entry in the SI table can be referred to by several network nodes. The term entry is here to be interpreted as a row in the SI table. One example of an SI table is shown in Table 1 below.

TABLE 1

Example of an SI table

| Index | Valid DL band | RACH uplink band index | RACH power offset | RACH preamble root sequence | ... | Transmit power |
|---|---|---|---|---|---|---|
| 0 | 2.0-2.1 GHz | 137 | 0 dB | 66 | ... | 30 dBm |
| 1 | void | void | void | void | ... | void |
| 2 | 1.8-1.9 GHz | 155 | 6 dB | 68 | ... | 40 dBm |
| ... | ... | ... | ... | ... | ... | ... |
| 31 | 900-1000 MHz | 23 | 10 dB | 24 | ... | 50 dBm |

In table 1, the first column contains an index of an entry in the table, while the remaining columns contain system access parameters allowing a wireless terminal to gain system access to the cellular network 9, such as through random access. The parameters can vary depending on implementation, but here includes, Valid DL band, RACH uplink band index, RACH power offset, RACH preamble root sequence, transmit power, etc.

The SI table can be designed to withstand high time dispersion (e.g. using a long cyclic prefix), so that a wireless terminal can easily and reliably detect it, even if the same signal is transmitted from multiple different network nodes.

The SI table is transmitted to the wireless terminal 2, which stores the SI table for later use. A network node can then simply transmit an index in the SI table corresponding to the system access parameters to be used for gaining access to the network node in question. By only transmitting an index, instead of all system access parameters as done conventionally, this greatly reduces the amount of system access parameters which each network node need to transmit, effectively reducing resource usage. Such a table entry index represents what is herein referred to as a system signature, i.e. it may be mapped to a set of system access related parameters. A table entry index may also be referred to as a table entry identifier or an entry identifier.

Each entry in the SI table may be used by several network nodes. In particular, network nodes of a similar size, such as the second and third network nodes 1b-c could benefit from having the same system access parameters.

The SI table can be transmitted in broadcast single frequency network (SFN) format (i.e. with extended cyclic prefix). The same SI table being transmitted from multiple network nodes are then superimposed over the air. Moreover, the SI table is designed for large DTX (Discontinuous Transmission) ratios (e.g. 1:1000) in order to allow for low energy consumption in each network node. Network nodes with different downlink power can use different entries in the SI table.

The SI table may be provided using broadcasting e.g. by a sparsely deployed layer of macro cells (such as the first radio cell 4a), a so called macro layer, and/or by a selected subset of the small nodes, as long as it is ensured that the transmissions cover the entire network area. The repetition interval with which the SI table is broadcast is a trade-off between energy/system efficiency and speed of initial access.

As explained above, the SI table comprises system access parameters provided to the wireless terminals on how the terminals should perform their initial access to the system. Additional system information such as network wide common system information and node specific system information can be communicated to the wireless terminal after initial system and network node access, respectively.

Each wireless terminal reads and stores at least the initial access related part of the SI table. The wireless terminal then tries to detect any received system signatures from network nodes and measures the received strength of them. In case multiple network nodes transmit the same entry index, the wireless terminal can measure the combined strength of the signals it can receive. Before making an initial transmission, the wireless terminal selects one entry based on the received signal strengths and system information parameters. In one embodiment, the wireless terminal selects the network node with the strongest signal. In one embodiment, the system may provide a power offset, which is specific to each entry, such that the terminal should add to the received signal strength from the network node, and then select the entry with the highest resulting value. The wireless terminal then uses the system access information associated with the selected entry when performing the initial system access, e.g. using random access.

Figure 2A:
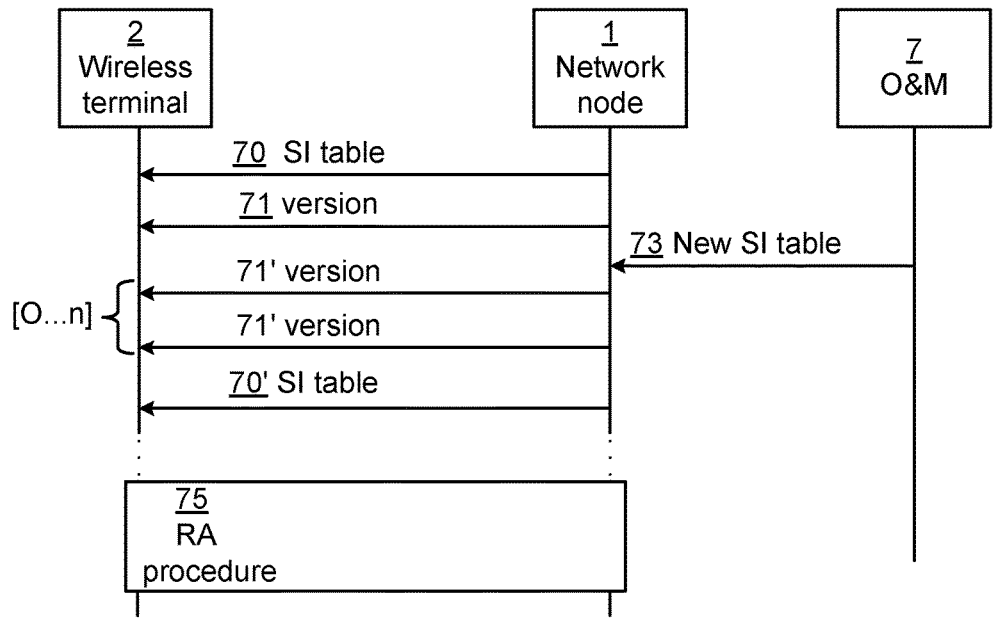
FIGS. 2A-B are sequence diagrams illustrating how system information is communicated in the cellular network of FIG. 1.
Figure 2B:
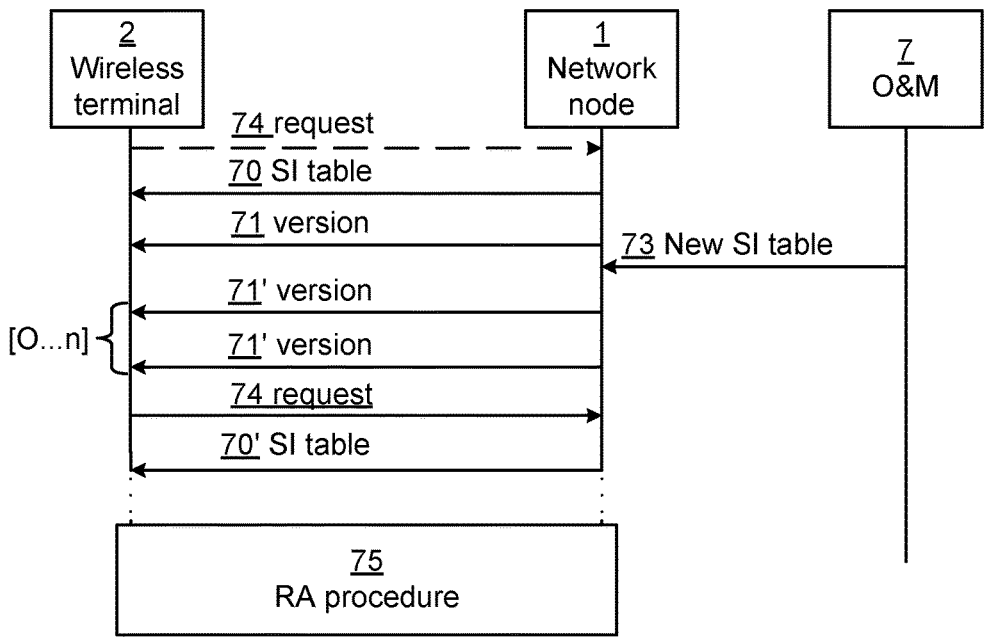

FIGS. 2A-B are sequence diagrams illustrating how system information is communicated in the cellular network of FIG. 1. According to embodiments presented herein, the broadcasting of system information can be reduced even further than explained above by, for part of the transmissions of the SI table, only sending out a version indicator of the currently valid SI table. In this way, a wireless terminal which has a stored SI table with a matching version indicator (i.e. referring to the same version), does not need to receive a new SI table, but can use the stored SI table. The version indicator can be any suitable indicator with sufficiently high number of possible values. In one embodiment, the version indicator can be a serial number of a certain number of bits, which increments one step for every new version of the SI table. In one embodiment, the version indicator is obtained using a one way function, such as a hash function, on the SI table itself.

In FIG. 2A, an embodiment is shown where the SI table is transmitted only occasionally, and at other times, only the version indicator is transmitted. In FIG. 2B, an embodiment is shown where the SI table is transmitted upon request from a wireless terminal.

Describing first a sequence with reference to FIG. 2A, the network node 1 transmits a currently valid SI table 70 using the broadcast channel as explained above. This SI table 70 can be received by any number of wireless terminals 2 within the coverage of the network node 1. A version indicator can be included with the SI table.

At other occasions, a version message 71 is transmitted on the broadcast channel. The version message is significantly smaller than the SI table, requiring less resources and energy, which, when effected for many network nodes across an entire network, can lead to significant savings in energy usage. Optionally, the version message comprises a network identifier, identifying the cellular network (see 9 of FIG. 1). The version message can even comprise the network identifier. For example the network identifier can be a PLMN ID (Public Land Mobile Network identifier) comprising a MCC (Mobile Country Code) and a MNC (Mobile Network Code). The network node 1 then receives a new SI table 73, e.g. from an operation and maintenance system 7. Any wireless terminals needing system access to the cellular network, e.g. through random access, would thus need the new SI table.

The network node 1 transmits zero to n version messages 71', but these version messages now comprise a version indicator of the new SI table.

Nevertheless, at some point, the network node 1 transmits the new SI table 70', which can be received by the wireless terminal 2.

The wireless terminal is then able to perform system access, e.g. using a random access procedure 75.

One way to provide flexibility to the operator when updating the SI table at any time is to use notification broadcast transmissions in the system when the SI table is changed. Such notifications can be transmitted by all network nodes (i.e. in all cells) in the network, e.g. together with the table entry identifier broadcast transmissions, so that attached wireless terminals may receive the notification irrespective of which network node they are monitoring (e.g. are camping on).

The notification can be repeated a certain number of times, during a certain time period, which suffices to ensure that all attached wireless terminals (or the vast majority of them) have a reasonable chance to receive it (possibly excluding wireless terminals with very long DRX (Discontinuous Reception) sleep periods). To speed up the process of providing up to date system information to the wireless terminals, one or more of the version messages following the SI table update (which takes place after the notification transmission(s)) could be replaced by transmissions of the updated full SI table. An even faster way would be that the new SI table is transmitted one or more times more or less immediately following the SI table update (which takes place after the notification transmission(s)), i.e. deviating from the regular periodicity of the version indicator (and SI table) transmission. With this method of extra transmissions, an option could be to transmit only the updated parts of the SI table. Such a reduced SI table would have an indicator informing the wireless terminals that the SI table is a subset of the full SI table, so that newly arrived wireless terminals, which may not have acquired the full SI table, know that they have to wait to receive a full SI table.

Another possible mechanism for handling SI table updates is to associate an expiration date and time for each version of the table. Hence, when the expiration date and time has expired for an SI table version stored in a wireless terminal, the wireless terminal should assume that the SI table may no longer be valid and should start monitoring appropriate network nodes in order to acquire the new, potentially updated version of the SI table. Also with this method, the process may be sped up as described above, i.e. by replacing one or more transmission(s) of the version indicator with full SI table transmission(s) or transmitting the new SI table one or more times more or less immediately following the expiration of the old SI table.

To further facilitate the change between two versions of the SI table, the old and the new versions may be broadcast in parallel for some time (wherein the new version may contain only the subset of the information that has been updated, as described above), so that wireless terminals may proactively retrieve the new version before the old version expires. Such parallel transmissions may be used both with the notification method and the expiration method described above.

Yet another alternative way of handling SI table updates could be to rely on attached wireless terminals to autonomously determine that their stored SI tables have become obsolete, based on repeated access failures.

Looking now to FIG. 2B, when the wireless terminal 2 initially does not have a current SI table, the wireless terminal 2 here transmits a request 74 to the network node 1, instead of waiting until a next broadcast of the SI table.

It is to be noted that at this stage, traditional random access is not available, so other ways of communication need to be used for the wireless terminal 2 to be able to transmit the request. In one embodiment, the system allows for an anonymous SI table request procedure that is only used for this purpose, i.e. to request information on how to do a proper random access. This request procedure is then provided to the wireless terminal 2 and can be configured such that it is never changed. In one embodiment, a previously stored SI table may be used for a while after it has expired and a new SI table is being transmitted. If a network node receives an erroneous random access from a wireless terminal 2 it may interpret this as a request for the proper SI table. The wireless terminal 2 may even know that the random access parameters used are not valid and would in this case also see this as a request for the proper SI table. In one scenario, a connection is already established between the wireless terminal 2 and the network node 1. In such a scenario, an uplink channel dedicated to the wireless terminal 2 can be used for this purpose.

The network node 1 responds by sending a currently valid SI table 70. This can be done using the broadcast channel as explained above. Alternatively, a specific channel for the wireless terminal 2 is used, such as in a scenario where a connection is already established between the wireless terminal 2 and the network node. As explained above, the SI table 70 can be received by any number of wireless terminals 2 within the coverage of the network node 1.

Also in this embodiment, at other occasions, a version message is transmitted 71 on the broadcast channel.

The network node 1 subsequently also here receives a new SI table 73, e.g. from the operation and maintenance system 7. Any wireless terminals needing to access the cellular network would thus need the new SI table. In this embodiment, however, there is no automatic broadcast of the SI table, as it is only transmitted on request.

Nevertheless the network node 1 continues to transmit more version messages 71', but these version messages now comprise a version indicator of the new SI table.

When a wireless terminal 2 within the coverage of the network node 1 needs to perform an initial access to the network, the wireless terminal 2 can compare the version indicator of the new version message 71' and the version indicator of the stored SI table 70. Since these refer to different versions, the wireless terminal 2 will transmit a new request 74 to the network node 1. The network node 1 then responds with transmitting the new SI table 70'. At that point, the wireless node 2 can store the new, up-to-date, SI table 70' (including its associated version identifier), allowing the wireless terminal 2 to access the network node 1 (or any other network node of the cellular network, if the wireless terminal has moved), e.g. by perform a random access procedure 75 with the network node 1.

The approach illustrated in FIG. 2B may be motivated by the assumption that, even though the SI table is transmitted only by a selected subset of the network nodes in the system, aiming to provide (more or less) complete coverage, rather few of the SI table transmissions will actually have interested receivers (i.e. wireless terminals in need of the transmission). This may be assumed because SI table updates will probably be rather rare and most wireless terminals repeatedly attach to the same network(s) and thus have the valid SI table stored. Moreover, the small minority of the wireless terminals that attach to the network for the first time only need a single transmission of the SI table.

Hence, the scarce, periodic SI table transmissions described with reference to FIG. 2A are either omitted or replaced by transmissions of the SI table version indicator here. Instead, a wireless terminal in need of an SI table transmission may request the network node to transmit it. To this end, uplink transmission resources may be reserved for the purpose of requesting SI table transmissions. These uplink resources (e.g. time and frequency) should be unambiguously derivable in relation to the version indicator transmissions.

The uplink resources may be shared among all wireless terminals (i.e. such that any UE may use them). A request transmission may be very simple. Its properties should include that it is easily detected irrespective of uplink time alignment and potential parallel transmissions from multiple wireless terminals. Making it short, resource and energy efficient would also be beneficial. A possible choice could be a kind of preamble, similar to the ones used for Random Access transmissions in LTE.

As in the embodiment described with reference to FIG. 2A, either notifications or expiration dates/times may be used to facilitate smooth handling of changes of the SI table.

Notifications may be followed by one or more transmissions of the SI table. As in embodiment described with reference to FIG. 2A, this/these transmission(s) may occur soon, or more or less immediately following the SI table update following the notification transmissions (i.e. deviating from the regular version indicator transmission periodicity), replacing the next version indicator transmission(s) or at the next occasion(s) of the SI table transmission according to an predetermined periodic pattern.

If an expiration time (expiration date/time) is used, the new (provided that it is updated) SI table could be transmitted one or a number of times upon expiration of the validity of the old SI table. As explained above, the transmission(s) may follow a predetermined pattern for scarce, periodic SI table transmissions, replacing version indicator transmission(s) or occurring more or less immediately after the expiration of the old SI table, thus deviating from the version indicator transmission periodicity.

Parallel transmission(s) of the old and the new SI table may also be used, e.g. some time before the update is enforced.

Hybrid embodiments are also possible, combining the embodiments illustrated in FIGS. 2A and 2B. In a first hybrid embodiment, it is based on requests of the full (or partial) SI table (with only SI table version indicators being broadcast), as in the embodiment described with reference to FIG. 2B. However, the way to access the system for such requests is made more flexible. To this end, information about how to access the system for request of SI table information is periodically broadcast. This access configuration information may be very lightweight, e.g. including basic information such as indication of MCS (Modulation and Coding Scheme) and a contention based uplink transmission resource. Special variants of the lightweight access configuration information could be used to indicate how to request specific parts of the SI table information, e.g. parts concerning access to other carriers and/or RATs (Radio Access Technologies).

As a further option, version indicators could be used for the lightweight access configuration information too, such that it is only infrequently broadcast with more frequently broadcast version indicators in between (i.e. similar to the principle of the embodiment described with reference to FIG. 2A).

This hybrid option may be generalized to periodic broadcast of any "pre-full-access-stage" configuration information or any partial or limited SI table information, while the full SI table (or the remaining part of the SI table) is only available on request. An example could be that the full SI table information related to the present carrier and/or RAT is periodically broadcast, whereas information related to access to other carriers and/or RATs is only available on request.

In a second hybrid embodiment, the SI table is infrequently broadcast with more frequent version indicator broadcast transmissions in between, just as in the embodiment described with reference to FIG. 2A. In addition to this, full or partial SI table information is available on request for certain access classes, e.g. emergency calls or accesses related to critical public services such as police operations or public safety related operations. The purpose would be to provide faster access to SI table information for critical accesses, when needed. Optionally, this "shortcut" to SI table information could be available for all access classes.

It may be useful to introduce a restriction on the frequency of SI table changes, e.g. in terms of a maximum number of updates (i.e. version upgrades) during a certain time period. The maximum number of updates can be equal to the full range of the version indicator, i.e. a serially incremented version indicator would not be allowed to wrap around, thereby causing ambiguity, within the specified time period. In practice, the choice of version indicator length and time period will depend on the expected frequency of (desired) updates and what is considered a reasonable version indicator wrap around period from a wireless terminal point of view. As an example, the version indicator could be 8 bits long and the specified time period could be 48 hours, thus allowing up to 255 SI table updates (version changes) in 48 hours. Other examples could be a 10-bit version indicator and a specified time period of 7 days, allowing up to 1023 SI table updates in a week, or a 10-bit version indicator and a specified time period of 30 days.

A wireless terminal can optionally maintain a timer which is restarted when a new version indicator (or new full SI table) is received and which expires when the specified time period has elapsed. Hence, while the timer is running, the wireless terminal considers a stored version indicator as valid for comparison with a broadcast version indicator, whereas after expiration of the timer, the wireless terminal discards any stored version indicator, since the broadcast version indicator may have wrapped around and would not allow unambiguous comparison with the stored version indicator.

The solutions and its various variants and options include several parameters that may be tuned or optimized. Examples include frequency of version indicator broadcasts, frequency of full SI table broadcasts, frequency of lightweight access configuration information, minimum time period for version indicator wrap around, etc. Such tuning or optimization may be performed off-line and executed via an O&M system, or it may be performed by the network itself in the form of self-tuning or self-optimization. Regardless of which, the tuning or optimization requires appropriate statistics on the performance of the scheme as input data.

To this end it may be useful to monitor aspects, such as how often SI table information is requested and for what access classes or how often the SI table version is upgraded. Another aspect that may be of interest to monitor, at least if no SI table update frequency restriction is employed, is how often wireless terminals fail to use their stored access information. A way to realize such monitoring could be that wireless terminals which fail to use their stored access information, report such failures when they eventually manage to connect to the network, e.g. similar to how LTE wireless terminals may report various issues, such as failed random access attempts, in a UEInformationResponse RRC message.

Figure 3A:
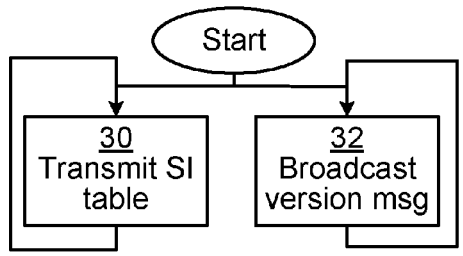
FIGS. 3A-B are flow charts illustrating the sending of system information in a network node of FIG. 1.
Figure 3B:
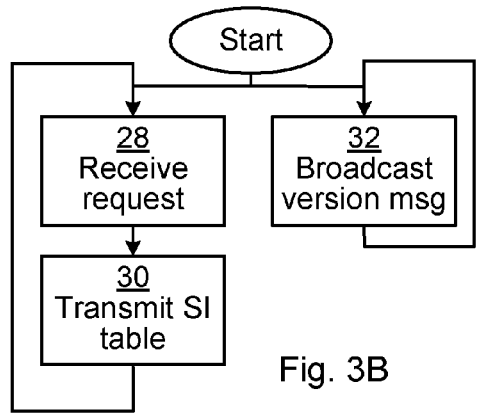

FIGS. 3A-B are flow charts illustrating the sending of system information in a network node of FIG. 1. The flow charts correspond at least partly with the sequence diagrams shown in FIG. 2A-B. The method illustrated in FIG. 3A corresponds to the network node part of the sequence diagram of FIG. 2A.

In a broadcast SI table step 30, the network node broadcasts an SI table and a version indicator of the SI table. This broadcast can be performed using one or more messages. In one embodiment, this transmission occurs over a broadcast channel so that any wireless terminal in the vicinity can make use of the SI table.

The times (and other resources e.g. frequency) of the transmissions of the full SI table can be predefined, allowing any wireless terminals to know when to expect the SI table to be transmitted. For example, the transmission of the full SI table could be fixed in relation to some system frame or time keeping, e.g. indicated by some reference signal transmission. This indication may well be transmitted together with, or be integrated with, the SI table version indicator.

Separately, in a broadcast version message step 32, the network node broadcasts a version message comprising the version indicator of the SI table. As explained above, the version message does not comprise the SI table.

The steps of broadcasting the SI table and broadcasting the version message can occur independently. Optionally, one or both steps occur at regular intervals. In one embodiment, the broadcast SI table step 30 occurs once for every n times that the step of broadcasting version message occurs, where n is any positive integer. A greater n implies less resource usage, since fewer SI tables are transmitted, at the expense of potentially longer initial access if the wireless terminal has to wait a relatively long time to receive the SI table with the system access parameters required for system access. In other words, the step of broadcasting the SI table can be performed less frequently than the step of broadcasting the version message to thereby reduce energy requirements for transmissions. In one example, n has been selected to 20, which significantly reduces the amount of SI data which is broadcasted.

The SI table version indicator may, in addition to being broadcast as a separate indicator in the version message (in step 32), be included or integrated in the SI table or in some other way associated with the SI table, such that it is being broadcast together with the SI table (in step 30), either in the same message or as a separate message.

The method illustrated in FIG. 3B corresponds to the network node part of the sequence diagram of FIG. 2B. Here, a receive request step 28 precedes the broadcast SI table step 30. In the receive request step 28, the network node receives a request from a wireless terminal to broadcast a current SI table (preferably, but not necessarily, including its associated version indicator).

The resources for request messages are shared among all wireless terminals. A request transmission may be very simple. Its properties should include that it is easily detected irrespective of uplink time alignment and potential parallel transmissions from multiple wireless terminals. Making the request transmission short, resource and energy efficient would also be beneficial. A possible choice could be a kind of preamble, similar to the ones used for Random Access transmissions in LTE.

The broadcast SI table step 30 here occurs as a response to the receive request step 28. Upon detection of the request from a wireless terminal the network node thus transmits the full SI table (preferably, but not necessarily, including its associated version indicator). There are several options for how to handle this transmission:

The network node may respond with an SI table transmission at a predictable time and resource (in relation to the request), such as a predefined time slot, more or less immediately after receiving the request (possibly with some (predictable) delay in order to allow some flexibility to the scheduler so that it does not have to reserve these resources).

The network node may respond by replacing the next transmission of the SI table version indicator with a transmission of the full SI table.

Assuming a predefined pattern of scarce, periodic transmissions of the SI table (as in the embodiment described with reference to FIG. 2A), wherein the actual SI table transmissions are either omitted or replaced by version indicator transmissions, the network node may respond to the request by neither omitting nor replacing the next transmission of the full SI table (in accordance with the predefined pattern).

The first of these options provides the shortest access delay for the wireless terminals that use the mechanism. This reduced access delay is also one of the advantages of this embodiment compared to the embodiment described with reference to FIG. 2A. Another advantage is that, provided that the assumption about few receivers of the SI table transmission holds, the broadcast transmissions in the network will be reduced even further. However, in this embodiment, uplink resources do have to be reserved for request transmissions and the network node does need to monitor these resources for request transmissions.

Figure 4A:
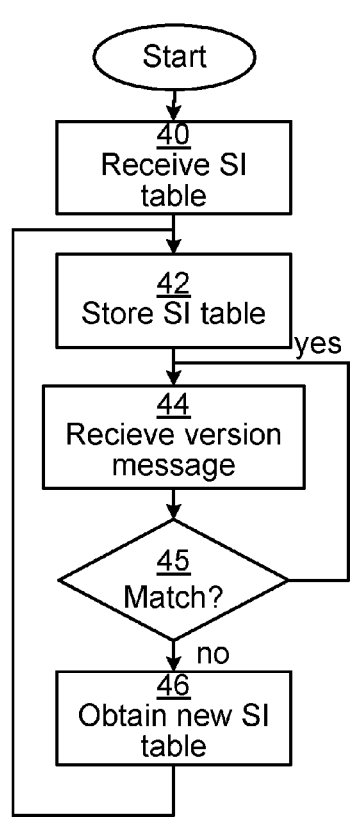
FIGS. 4A-B are flow charts illustrating the receiving of system information in a wireless terminal of FIG. 1.
Figure 4B:
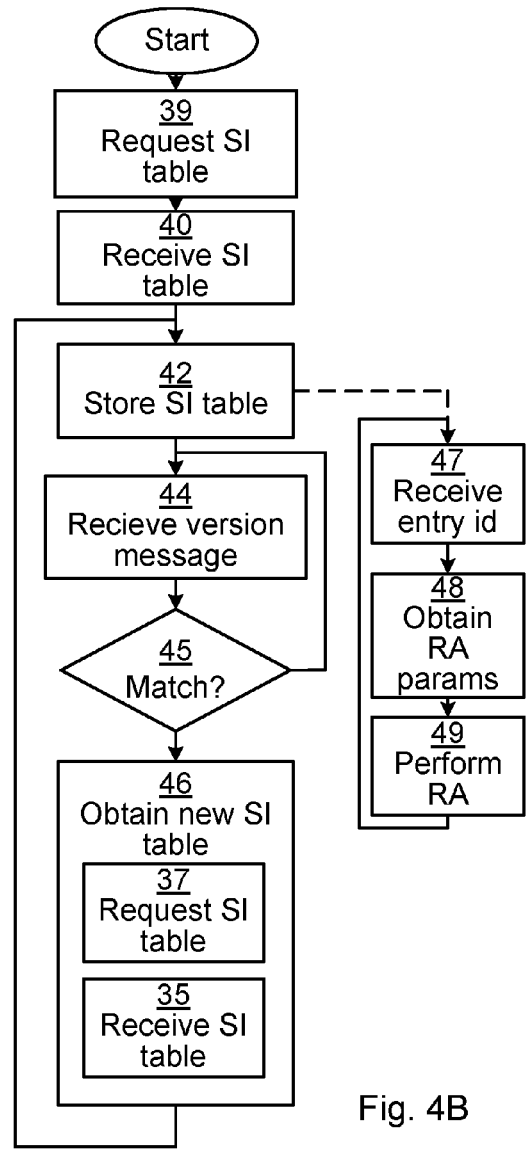

FIGS. 4A-B are flow charts illustrating the receiving of system information in a wireless terminal of FIG. 1. The flow charts correspond at least partly with the sequence diagrams shown in FIG. 2A-B, respectively. The method illustrated in FIG. 4A corresponds to the wireless terminal part of the sequence diagram of FIG. 2A.

In a receive SI table step 40, the wireless terminal receives, using at least one message over a broadcast channel from a network node, an SI table and a version indicator of the SI table. In one embodiment, a subscriber identity module (SIM) or universal subscriber identity module (USIM) of the wireless terminal, such as on a SIM card or on a universal integrated circuit card (UICC), contains a default SI table. This default SI table can optionally have a predefined version indicator (e.g. 0) or can have a regular version indicator.

In a store SI table step 42, the SI table and its version indicator (which may be received as part of the SI table or as a separate indicator in the same or a separate message) are stored. The wireless terminal stores the SI table, including its associated version indicator, in a non-volatile memory (64 of FIG. 6), such as in the USIM (Universal Subscriber Identity Module), i.e. on the UICC (Universal Integrated Circuit Card), or in the wireless terminal itself (i.e. the non-UICC part of the wireless terminal). Prior to storing the SI table, including its associated version indicator, the wireless terminal may check whether it already has stored the same version of the SI table and if this is the case, the storing step 42 would be redundant and the wireless terminal may omit it.

In a receive version message step 44, a version message comprising a second version indicator of an SI table is received over a broadcast channel from the network node. The version message does not comprise the SI table.

In a conditional match step 45, the version indicator of the SI table and second version indicators are compared. If these version indicators refer to the same version, the stored SI table is still valid and the method returns to the receive version message step 44. Otherwise, when there is no match, i.e. the version indicators refer to different versions, the stored SI table is not valid, and the method continues to an obtain new SI table step 46.

In the obtain new SI table step 46, a new SI table associated with the second version indicator is received. This step corresponds to the previous receive SI table step 40, where the table and version indicator now are different.

A stored SI table does not need to be discarded when the wireless terminal leaves the network (e.g. when going abroad or being turned off). Hence, when returning to the home network, e.g. after having been abroad or turned off, if the SI table has not changed, the wireless terminal will quickly realize from the broadcasted version indicator that the stored SI table is still valid and that the data therein can be used for random access/system access. Analogously, the SI table for any visited network, e.g. abroad, can be stored and reused at a later point, if the SI table for the visited network still has the same version indicator.

The method illustrated in FIG. 4B corresponds to the wireless terminal part of the sequence diagram of FIG. 2B. Here, a request SI table step 39 precedes the receive SI table step 40. In the request SI table step 39, a request is transmitted to the network node to broadcast a current SI table (preferably, but not necessarily, including its associated version indicator).

In one embodiment, a wireless terminal is provided with the opportunity to request not only the full SI table, but also selected parts of the table or selected updates of the table.

For instance, a wireless terminal could request to receive parts of the SI table that concerns access information for other carriers and/or other RATs. An even more useful option would be that a wireless terminal may request the last updates of the SI table (i.e. the difference from the previous SI table version) or the accumulated updates from the last N versions or since a specific version M. (where the wireless terminal supposedly has retrieved and stored SI table version M during a previous access to the network).

Moreover, the obtain new SI table step 46 here comprises a new request SI table step 37 and a new receive SI table step 35 where the table and version indicator now are different. The new request SI table step 37 corresponds to the preceding request SI table step 39 and the new receive SI table step 35 corresponds to the preceding receive SI table step 40. In fact, the processing may be identical in the corresponding steps and the only aspect that differs may be the conditions under which they are performed.

In FIG. 4B, it is also shown that after the store SI table step 42, the method can continue in a parallel process to a receive entry id step 47 in order to start a system access procedure.

In the receive entry id step 47, the wireless terminal receives, over a broadcast channel from a network node, a broadcast message comprising the entry identifier.

In the obtain SA (system access) parameters step 48, the wireless terminal obtains a current set of system access parameters associated with the entry identifier from the stored SI table In a perform SA step 49, the wireless terminal is then able to perform the system access procedure using the current set of system access parameters, to set up a connection with the network node. In one embodiment, this step comprises using a random access procedure.

When system access needs to be performed again, the method returns to the receive entry id step 47.

In one embodiment, if the wireless terminal, despite using a seemingly valid stored SI table, repeatedly fails to access the system based on the contents of the SI table entry indicated by the received entry identifier, the wireless terminal assumes that the stored SI table after all has become obsolete and the method returns to the beginning of the method, to the request SI table step 39.

In the scenario that the wireless terminal stores a default system information table, e.g. on a SIM, USIM or similar, the initial steps to request SI table 39 and receive SI table 40 as well as an initial iteration of the step to store the SI table 42 are omitted.

Figure 5:
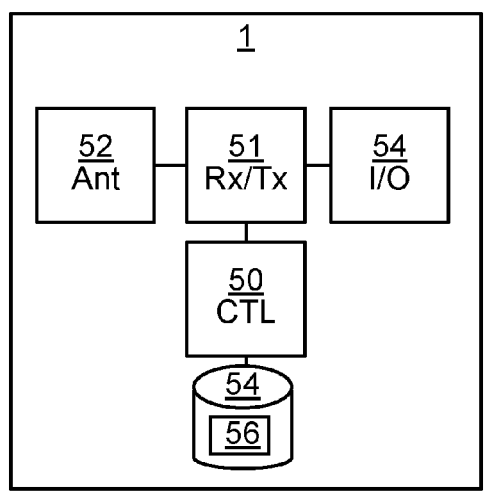
FIG. 5 is a schematic diagram illustrating some components of a network node of FIG. 1.

FIG. 5 is a schematic diagram illustrating some components of a network node of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a computer program product 54, e.g. in the form of a memory. The processor 50 may be configured to execute the method described with reference to FIGS. 3A-B above.

The computer program product 54 may be a memory or any combination of read and write memory (RAM) and read only memory (ROM). The memory also comprises persistent storage, which, for example, may be any single one or combination of magnetic memory, optical memory, solid state memory or even remotely mounted memory.

The network node 1 further comprises an I/O interface 54 for communicating with the core network and/or optionally with other network nodes.

The network node 1 also comprises one or more transceivers 51, comprising analogue and digital components, and a suitable number of antennas 52 for radio communication with wireless terminals within one or more radio cells, e.g. transmitting and receiving messages as explained in detail above. The processor 50 controls the general operation of the network node 1, e.g. by sending control signals to the transceiver 51 and receiving reports from the transceiver 51 of its operation.

Figure 6:
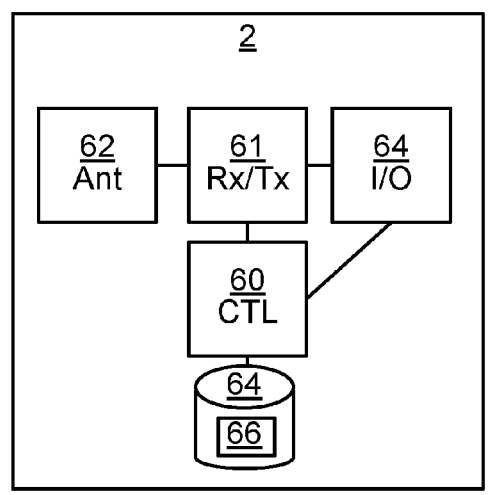
FIG. 6 is a schematic diagram illustrating some components of the wireless terminal of FIG. 1.

FIG. 6 is a schematic diagram illustrating some components of the wireless terminal of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a computer program product 64, e.g. in the form of a memory. The processor 60 may be configured to execute the method described with reference to FIGS. 4A-B above.

The computer program product 64 may be a memory or any combination of read and write memory (RAM) and read only memory (ROM). The memory also comprises persistent storage, which, for example, may be any single one or combination of magnetic memory, optical memory, solid state memory or even remotely mounted memory.

The wireless terminal 2 further comprises an I/O interface 64, e.g. comprising a user interface or interface to a host device comprising the wireless terminal 2.

The wireless terminal 2 also comprises one or more transceivers 61, comprising analogue and digital components, and a suitable number of antennas 62 for radio communication with network nodes, e.g. sending and receiving messages as explained in detail above. The processor 60 controls the general operation of the wireless terminal, e.g. by sending control signals to the transceiver 61 and receiving reports from the transceiver 61 of its operation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed in a network node, for sending system information, the method comprising:
broadcasting, using at least one message, a system information table and a version indicator of the system information table, the system information table comprising two or more entries, wherein each entry of the system information table comprises an entry identifier and a set of system access parameters for at least one corresponding radio node, such that a radio node broadcasting an entry identifier is accessible through system access by a wireless terminal having access to the system information table, and wherein at least one entry of the system information table comprises system access parameters for a radio node or radio nodes different than the broadcasting network node; and
broadcasting, a version message comprising the version indicator of the system information table, the version message omitting the system information table.

2. The method of claim 1, further comprising repeating said broadcasting of the system information table and the version indicator and repeating said broadcasting of the version message, such that broadcasting the system information table is performed less frequently than broadcasting the version message.

3. The method of claim 1, further comprising, prior to broadcasting the system information table, receiving a request from a wireless terminal to broadcast a current system information table, wherein broadcasting the system information table is performed in response to the step of receiving a request from the wireless terminal.

4. The method of claim 3, wherein broadcasting the system information table is only performed in response to the step of receiving a request from the wireless terminal.

5. The method of claim 1, wherein the version message comprises a network identifier.

6. A network node arranged to send system information to a wireless terminal, the network node comprising:
a processor; and
a computer program product storing instructions that, when executed by the processor, cause the network node to:
broadcast, using at least one message, a system information table and a version indicator of the system information table, the system information table comprising two or more entries, wherein each entry of the system information table comprises an entry identifier and a set of system access parameters for at least one corresponding radio node, such that a radio node broadcasting an entry identifier is accessible through system access by a wireless terminal having access to the system information table, and wherein at least one entry of the system information table comprises system access parameters for a radio node or radio nodes different than the broadcasting network node; and
broadcast, a version message comprising the version indicator of the system information table, the version message omitting the system information table.

7. The network node of claim 6, wherein the instructions are configured to cause the network node to repeat said broadcasting of the system information table and the version indicator and to repeat said broadcasting of the version message, such that the system information table is broadcast less frequently than the version message.

8. The network node of claim 6, wherein the computer program product further comprises instructions to receive a request from a wireless terminal to broadcast a current system information table, wherein the instructions to broadcast the system information table are performed in response to the instructions to receive a request from the wireless terminal.

9. The network node of claim 8, wherein the instructions to broadcast the system information table are only performed in response to the instructions to receive a request from the wireless terminal.

10. The network node of claim 6, wherein the version message comprises a network identifier.

11. A method, performed in a wireless terminal for receiving system information, the method comprising:
receiving, using at least one message over a broadcast channel from a network node, a system information table and a version indicator of the system information table, the system information table comprising two or more entries, wherein each entry of the system information table comprises an entry identifier and a set of system access parameters for at least one corresponding node, and wherein at least one entry of the system information table comprises system access parameters for a radio node or radio nodes different than the node from which the system information table is received;
storing the system information table and the version indicator;
receiving, over a broadcast channel from the network node, a version message comprising a second version indicator of a system information table, the version message omitting the system information table; and
when the version indicator of the system information table and second version indicators refer to different versions, obtaining a new system information table associated with the second version indicator.

12. The method of claim 11, further comprising:
receiving, over a broadcast channel from a radio node, a radio node broadcast message comprising an entry identifier value;
obtaining, from the system information table, a current set of system access parameters associated with the entry identifier corresponding to the entry identifier value; and
performing a system access procedure using the current set of system access parameters to set up a connection with the radio node.

13. The method of claim 11, wherein obtaining the new system information table comprises receiving a new system information table and a version indicator of the new system information table, wherein the version indicator of the new system information and the second version indicator refer to the same version.

14. The method of claim 11, further comprising sending a request to the network node to broadcast a current system information table.

15. A wireless terminal arranged to receive system information from a network node, the wireless terminal comprising:
- a processor; and
- a computer program product storing instructions that, when executed by the processor, cause the wireless terminal to:
  - receive, using at least one message over a broadcast channel, a system information table and a version indicator of the system information table, the system information table comprising two or more entries, wherein each entry of the system information table comprises an entry identifier and a set of system access parameters for at least one corresponding radio node, and wherein at least one entry of the system information table comprises system access parameters for a radio node or radio nodes different than the node from which the system information table is received;
  - store the system information table and the version indicator;
  - receive, over a broadcast channel, a version message comprising a second version indicator of a system information table, the version message omitting the system information table; and
  - when the version indicator of the system information table and second version indicators refer to different versions, obtain a new system information table associated with the second version indicator.

16. The wireless terminal of claim 15, wherein the computer program product further comprises instructions to:
- receive, over a broadcast channel from a radio node, a radio node broadcast message comprising an entry identifier value;
- obtain, from the system information table, a current set of system access parameters associated with the entry identifier corresponding to the entry identifier value; and
- perform a system access procedure using the current set of system access parameters to set up a connection with the radio node.

17. The wireless terminal of claim 15, wherein the instructions to obtain the new system information table comprise instructions to:
- receive a new system information table and a version indicator of the new system information table, wherein the version indicator of the new system information table and the second version indicator refer to the same version.

18. The wireless terminal of claim 15, wherein the computer program product further comprises instructions to send a request to the network node to broadcast a current system information table.

* * * * *